Sept. 20, 1960
R. W. LUND
2,953,116
TETHER TROLLEY
Filed March 19, 1958
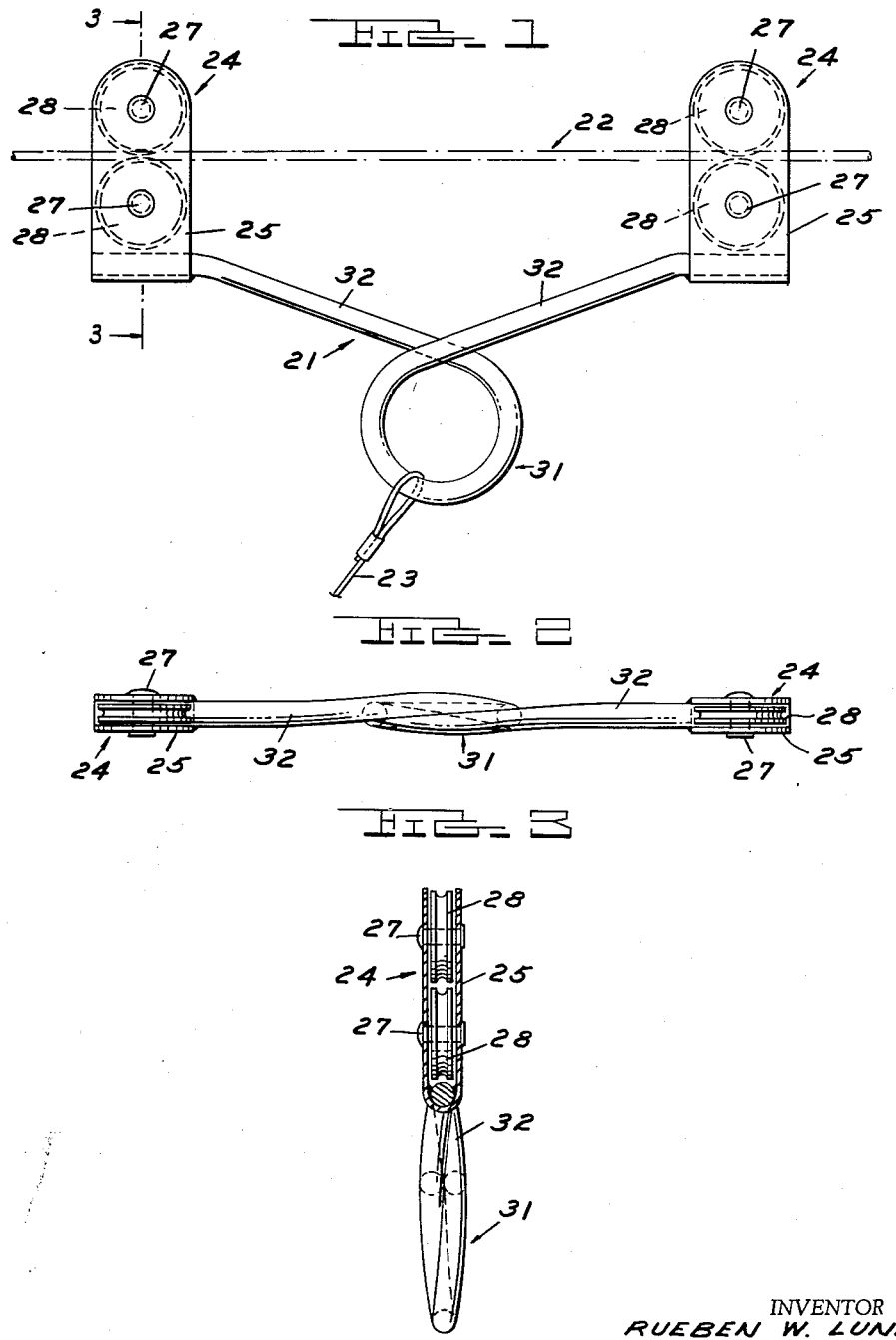
INVENTOR
RUEBEN W. LUND
BY Farley, Forster & Farley
ATTORNEYS

United States Patent Office 2,953,116
Patented Sept. 20, 1960

2,953,116

TETHER TROLLEY

Rueben W. Lund, 20188 Woodburn, Detroit 41, Mich.

Filed Mar. 19, 1958, Ser. No. 722,420

3 Claims. (Cl. 119—120)

This application pertains to a trolley which rides on a stretched cable and has a connection for an animal tether. The trolley is smooth running and is designed to eliminate binding between the trolley and cable. In addition, the trolley construction is capable of reducing shocks when it is brought abruptly to a stop by reaching its limit of travel. The trolley of this invention is yieldable and cooperates with the cable to utilize the resiliency of the cable in reducing uncomfortable and dangerous jarring motions upon an abrupt stop.

These multiple advantages are provided by a trolley having pulley assemblies which are spaced along and engageable with a trolley cable. Between the pulley assemblies is a loop spring, the ends of which are welded or otherwise fastened to the assemblies and the loop of which provides connecting means for the tether. Each pulley assembly is preferably constructed of a U-shaped housing which pivotally carries two vertically aligned pulleys adapted to receive a cable therebetween.

Due to the spaced pulley assemblies, free travel between the trolley and the cable is insured regardless of the magnitude and direction of force exerted by the tether. This permits the tethered animal maximum freedom without annoying and disturbing jerks or binds. Also, when the trolley reaches a limit of travel at either end of a cable, the loop spring distorts in the direction of the tether bringing the pulley assemblies closer together and providing a shock absorbing effect to an otherwise abrupt stop. A further absorbing effect is provided when the tether tends to rotate the trolley assembly against the resiliency of the cable. This graduating of the stop is much less annoying to the animal and also prevents serious injury.

It is, therefore, an object of this invention to provide a tether trolley which moves along a trolley cable with a minimum of actuating effort.

It is a further object to provide a trolley which has shock absorbing properties.

It is a further object to have a trolley with a pair of spaced pulley assemblies which are connected by a spring member.

An additional object is to provide each of said pulley assemblies with a pair of vertically aligned pulleys which are adapted to have a cable mounted therebetween.

These and other objects will become more apparent when a specific embodiment of this invention is considered in detail in connection with the following drawings:

Figure 1 is an elevational view of a trolley as mounted on a trolley cable shown in phantom;

Figure 2 is a plan view of the trolley; and

Figure 3 is a section taken at 3—3 of Figure 1 showing a sectioned pulley assembly and its mounting to a loop spring.

In Figure 1, trolley 21 is mounted on cable or guide member 22 and attached to tether 23. Trolley 21 is comprised of a pair of spaced pulley assemblies 24 which are connected to opposite ends of loop spring 31. The center or loop portion of spring 31 provides an attachment for tether 23 and also provides spring action. Each assembly 24 has U-shaped housing 25 (Figure 3) which supports two vertically spaced pins 27 on which pulleys 28 are pivotally mounted. Each pulley 28 is preferably made of molded nylon to provide a light, rustproof and strong construction having quiet, low frictional contact with pins 27. With two pulleys 28 in each assembly 24, any bouncing or separation between the assembly and the cable is prevented.

Tether 23 is designed for attachment to an animal, not shown, while cable 22 is attached at each end to suitable supports, not shown. Trolley 21 moves along cable 22 with a minimum of binding since each assembly 24 is maintained in a nearly perpendicular position relative to cable 22. Trolley 21 can rotate about the axis of the cable but has restricted rotative movement in a plane of the cable. The spring action occurs when an excessive force is exerted on the trolley after it has encountered a stop or other travel limiting condition. When the longitudinal travel of trolley 21 has been halted, a double shock absorbing action occurs. First the trolley is caused to pivot slightly about the end that has encountered the stop so that if the left end of the trolley is stopped, the right end will be pivoted slightly downwardly in a clockwise direction about the left end. This pivoting takes place against the resiliency of cable 22 and therefore provides a more gradual stopping. Further shock absorbing action occurs when spring 31 stretches or deforms in the direction of the tether 23 causing the spacing between assemblies 24 to decrease and the arms 32 of spring 31 to move toward each other in a closing action. This relative movement of arms 32 of spring 31 prevents an abrupt stoppage to tether 23 and the animal attached to the end thereof. This latter spring action is available when an excessive force perpendicular to cable 22 is exerted on trolley 21 and the action of spring 31 is likewise utilized.

While a preferred embodiment of my invention has been described above in detail, it will be understood that numerous modifications may be resorted to without departing from the scope of my invention as defined in the following claims.

I claim:

1. A shock absorbing free running tether trolley for tethering an animal to a run line such as a cable stretched between horizontally spaced anchor points comprising, a pair of trolley wheel assemblies spaced longitudinally in the direction of and adapted to travel freely along said run line, a resilient spring element connected at its ends to said trolley wheel assemblies establishing a normal predetermined longitudinal spacing thereof, a tether connection on said spring element intermediate its ends, said spring element being yieldable in a plane passing through said trolley assemblies and said connection whereby the application of a pulling force to said connection at the end of said run line or in a direction normal to said run line will deflect said spring element reducing the spacing between said trolley assemblies.

2. A tether trolley as set forth in claim 1 wherein said spring element comprises a spring wire rod having a loop formed at its center to serve both as said connection and as a spring coil.

3. A tether trolley as set forth in claim 1 wherein each of said trolley wheel assemblies includes a pair of opposed grooved wheels for engaging and confining said run line against lateral displacement.

References Cited in the file of this patent

UNITED STATES PATENTS

| | | |
|---|---|---|
| 78,631 | Wilkinson | June 2, 1868 |
| 857,924 | Crandall et al. | June 25, 1907 |
| 1,233,649 | Czaja et al. | July 17, 1917 |
| 1,563,212 | Madiar | Nov. 24, 1925 |
| 2,627,819 | Finkbeiner et al. | Feb. 10, 1953 |